(No Model.)
J. R. LITTLE.
METAL WHEEL.
No. 487,280. Patented Dec. 6, 1892.
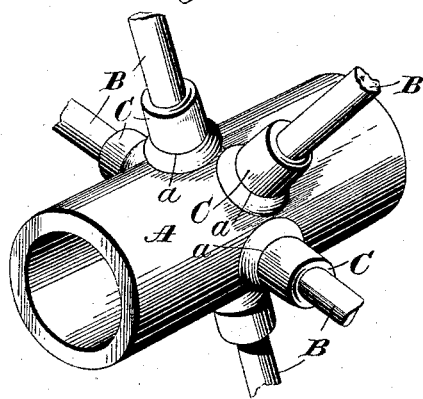
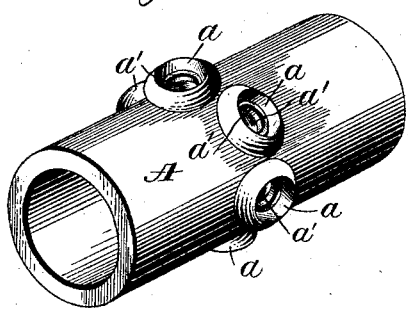
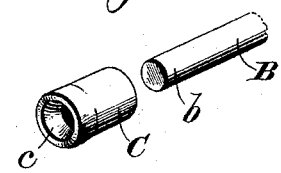
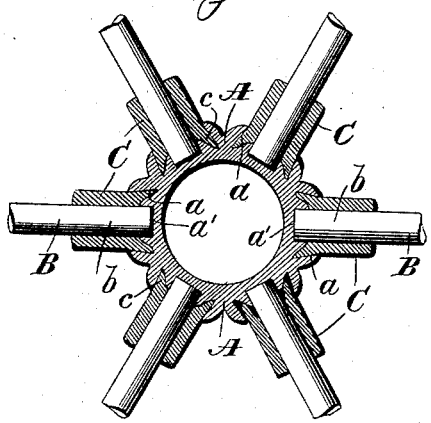
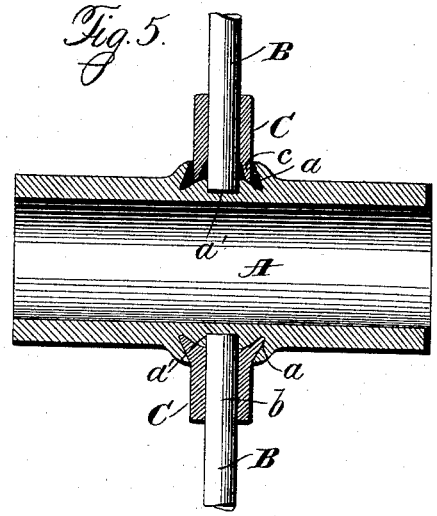
Witnesses:
Jas. E. Hutchinson.
Henry C. Hazard.
Inventor:
James R. Little, by
Prindle & Russell, his Attys.
THE NORRIS PETERS CO., PHOTO-LITHO., WASHINGTON, D. C.

UNITED STATES PATENT OFFICE.

JAMES R. LITTLE, OF QUINCY, ILLINOIS.

METAL WHEEL.

SPECIFICATION forming part of Letters Patent No. 487,280, dated December 6, 1892.

Application filed February 24, 1892. Serial No. 422,700. (No model.)

*To all whom it may concern:*

Be it known that I, JAMES R. LITTLE, of Quincy, in the county of Adams, and in the State of Illinois, have invented certain new and useful Improvements in Metal Wheels; and I do hereby declare that the following is a full, clear, and exact description thereof, reference being had to the accompanying drawings, in which—

Figure 1 is a perspective view of the hub portion of a metal wheel constructed after my improved method. Fig. 2 is a like view of the hub before the spokes are secured in position. Fig. 3 is a perspective view of the tenon end of a spoke and of a thimble employed for combining the same with a hub, and Figs. 4 and 5 are respectively a section of the hub upon a line passing circumferentially through the line of spokes and thimbles and a section upon a line passing lengthwise through said hub.

Letters of like name and kind refer to like parts in each of the figures.

My invention relates to wheels which are constructed wholly from metal; and it consists in a wheel having its hub and spokes combined in the manner and for the purpose substantially as hereinafter specified.

In the carrying of my invention into practice I construct a hub A from cast-iron, malleable iron, steel, or other like metal, and at equidistant points around the periphery provide recesses or sockets $a$ and $a$, which are preferably round, but may have any other form desired. Each socket has an increase of diameter from its outer end inward, and preferably is deeper at its sides than nearer its center. At the center of said socket there is preferably provided a cylindrical recess $a'$, that has such diameter as to adapt it to receive the inner end or tenon $b$ of a spoke B.

As a means for combining the spoke B with the hub A, I employ a thimble C, which is constructed from malleable iron, steel, or other similar metal in the general form of a cylinder. Interiorly the thimble is adapted to be passed over the inner end $b$ of said spoke, while exteriorly it has such size and shape as to enable it to be placed within and to loosely fill one of the sockets $a$, and at its lower end is provided with an outward annular projection or lip $c$, as shown. The thimble thus constructed is placed within a socket. A spoke is placed within the thimble, and by suitable mechanism the latter is then compressed laterally and longitudinally inward until it firmly embraces the spoke and its lower end is expanded and caused to closely fill the socket, by which means said spoke is so firmly combined with said hub as to enable it with safety to withstand any strain to which it would ordinarily be subjected.

If desired, the thimble may be compressed upon the spoke before being expanded into the hub and may be heated before compression, so as to add the effects of the shrinkage of the metal in cooling to the pressure produced by its compression. The hub may also be heated before the thimble is expanded into its socket and by its shrinkage increase the pressure upon said thimble.

While the thimbles are preferably secured upon the spokes by compression they may be combined therewith by means of a peripheral thread upon the spoke and an internal thread in the thimble.

Having thus described my invention, what I claim is—

1. A metal wheel in which each of the spokes and the hub are united by means of a thimble which is secured upon the inner end of the spoke and has its inner end expanded into and caused to fill a peripheral socket that is provided within said hub, substantially as and for the purpose specified.

2. A metal wheel in which each of the spokes is united to the hub by means of a metal thimble which is secured upon the inner end of the spoke and by longitudinal compression has its inner end expanded into and caused to fill a socket that is formed within the periphery of the hub, substantially as and for the purpose shown.

3. A metal wheel in which each spoke is united to the hub by means of a metal thimble which by lateral compression is secured upon the inner end of the spoke and by longitudinal compression has its inner end expanded into and caused to closely fill a peripheral socket that is provided in said hub, substantially as and for the purpose set forth.

4. A metal wheel in which is combined a hub having equidistant peripheral sockets and a central recess in the bottom of each, spokes that have their inner ends contained within such recesses, and thimbles which surround and are caused to closely embrace the inner portions of the spokes and have their inner ends expanded into and caused to fill said sockets, substantially as and for the purpose shown and described.

In testimony that I claim the foregoing I have hereunto set my hand this 28th day of January, 1892.

JAMES R. LITTLE.

Witnesses:
S. DEIDESHEIMER,
S. M. WALLACE.